(12) United States Patent
Drew et al.

(10) Patent No.: US 8,738,417 B2
(45) Date of Patent: May 27, 2014

(54) METHOD AND APPARATUS FOR PRODUCT MANAGEMENT

(75) Inventors: Julie W. Drew, Redwood City, CA (US); Bin Zhang, Freemont, CA (US); Shailendra Jain, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1400 days.

(21) Appl. No.: 11/108,396

(22) Filed: Apr. 18, 2005

(65) Prior Publication Data

US 2006/0235779 A1 Oct. 19, 2006

(51) Int. Cl.
*G06Q 10/00* (2012.01)
*G06Q 30/00* (2012.01)

(52) U.S. Cl.
USPC .......................... 705/7.29; 705/7.11; 705/7.36

(58) Field of Classification Search
USPC ....................... 705/7.11, 7.29, 7.36
See application file for complete search history.

(56) References Cited

U.S. PATENT DOCUMENTS

| | | | |
|---|---|---|---|
| 6,341,240 B1 * | 1/2002 | Bermon et al. | 700/97 |
| 6,366,890 B1 * | 4/2002 | Usrey | 705/10 |
| 6,826,538 B1 * | 11/2004 | Kalyan et al. | 705/7 |
| 6,920,366 B1 * | 7/2005 | Luh et al. | 700/101 |
| 7,092,776 B2 * | 8/2006 | Torii et al. | 700/99 |
| 2001/0047293 A1 * | 11/2001 | Waller et al. | 705/10 |
| 2003/0135399 A1 * | 7/2003 | Ahamparam et al. | 705/7 |
| 2005/0114196 A1 * | 5/2005 | Schoenmeyr | 705/10 |
| 2006/0089864 A1 * | 4/2006 | Feng et al. | 705/7 |
| 2006/0100940 A1 * | 5/2006 | Kakouros et al. | 705/28 |

OTHER PUBLICATIONS

Jeffrey, Alan. Advanced Engineering Mathematics, 2002, Harcourt/Academic Press, pp. 1060-1061.*
Bitran, Gabriel and Caldeney, Rene. An Overview of Pricing Models for Revenue Management. Dec. 2002. Sloan School of Management, MIT, Cambridge MA. Stern School of Business, New York University, New York, NY.*
Smith, Stephen A. and Agrawal, Narendra. Management of Multi-item Retail Inventory Systems with Demand Substitution. Operations Research, vol. 48, No. 1 (Jan.-Feb. 2000), pp. 50-64. Retrieved from http://www.jstor.org/stable/222913 on Aug. 4, 2010.*
Lawler, Eugene, "Combinatorial Optimization Networks and Matroids", 1976, pp. 122-128.
Balinski, M. L., "On a Selection Problem," Management Science, vol. 17, No. 3, Nov. 1970, pp. 230-231.
Hochbaum, D. S., "Selection, Provisioning, Shared Fixed Costs, Maximum Closure, and Implications on Algorithmic Methods Today," Management Science, vol. 50, No. 6, Mar. 14, 2004, pp. 709-723.
Gallo, G. et al., "A Fast Parametric Maximum Flow Algorithm and Applications," SIAM Journal of Computing, vol. 18, No. 1, Feb. 1989, pp. 30-55.
Hochbaum, D. S., "The Pseudoflow Algorithm and the Presduoflow based Simplex for the Maximum Flow Problem," Proceedings of Integer Programming and Combinatorial Optimization 6th Int'l. IPCO Conference, Houston, Texas, Jun. 1998, pp. 325-337.

(Continued)

*Primary Examiner* — Stephanie Delich

(57) ABSTRACT

A method for product portfolio analysis includes selecting a set of solution points along a curve of order benefit as a function of the number of products in a product portfolio and performing a heuristic between an adjacent pair of solution points that approximates the curve between the adjacent pair of solution points. An apparatus that can perform the product portfolio analysis is also described.

3 Claims, 4 Drawing Sheets

(56) References Cited

OTHER PUBLICATIONS

Ravindra, K. K. et al., "Improved Algorithms for Bipartite Network flow," SIAM Journal on Computing vol. 23, No. 5, Oct. 1994, pp. 906-933.

Rhys, J.M.W., "A Selection Problem of Shared Fixed Costs and Network Flows," Management Science, vol. 17, No. 3, Nov. 1970, 8 pp.

Hochbaum, D. S., "Economically Preferred Facilities Locations with Networking Effect," University of California, Berkeley, Feb. 14, 2005, pp. 1-26.

* cited by examiner

METHOD AND APPARATUS FOR PRODUCT MANAGEMENT

BACKGROUND

Product proliferation is a concern with many business enterprises because making or selling numerous products adds to inventory and management costs. Further, a business enterprise can lose sales as a result of consumer confusion stemming from numerous product choices. In today's fast paced business climate, businesses attempt to monitor the financial success of the products that are offered for sale. Businesses strive to select a particular product portfolio for sale to customers that increase the business' profit.

BRIEF DESCRIPTION OF THE DRAWINGS

For a detailed description of exemplary embodiments of the invention, reference will now be made to the accompanying drawings in which.

NOTATION AND NOMENCLATURE

Certain term(s) are used throughout the following description and claims to refer to particular system components. As one skilled in the art will appreciate, different companies/industries can refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection can be through a direct electrical connection, or through an indirect electrical connection via other devices and connections.

DETAILED DESCRIPTION

The following discussion is directed to various embodiments of the invention. Although one or more of the described embodiments can be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
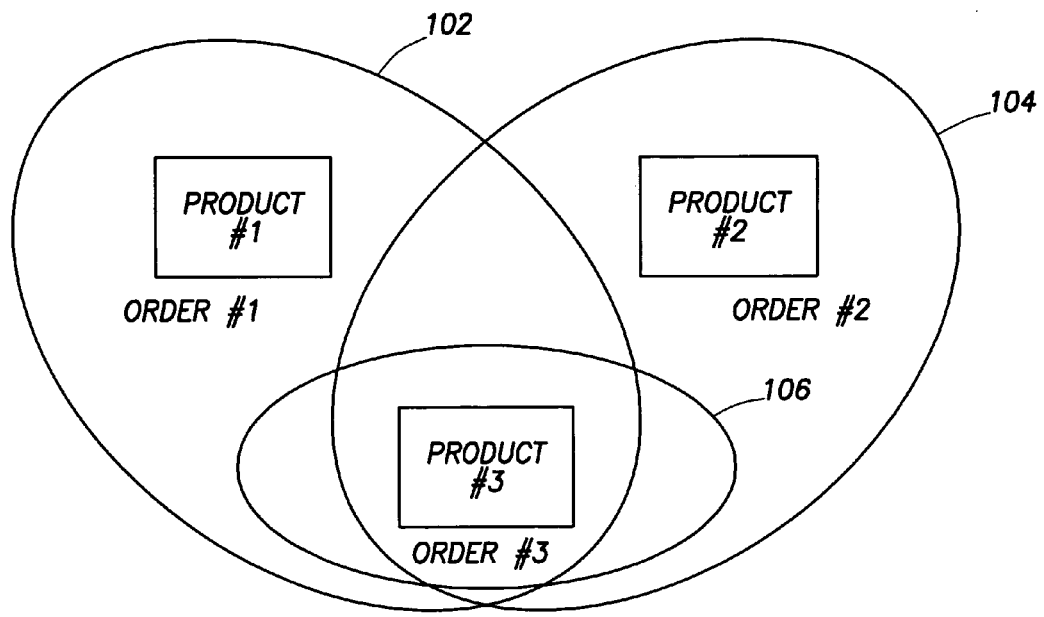
FIG. 1 shows a selection of product orders in accordance with an embodiment of the invention.

Referring to FIG. 1, there is shown product order information for three orders. Order 102 includes products #1 and #3, order 104 includes products #2 and #3, and order 106 includes product #3. Product #1 has revenue generation of $200, product #2 has revenue generation of $100 and product #3 has revenue generation of $1. If a product portfolio were selected based on just revenue generation which is referred herein as a simple ranking approach, product #1 would be chosen first, followed by product #2 and then by product #3. However, if product #3 which is a very low revenue generating product that is found in all three orders 102-106 is excluded from the product portfolio offering, it could be possible that none of the order revenue could have been realized given that it is part of all the orders. If product #3 were removed from the product portfolio, none of the orders 102-106 would be "covered" since all three orders require product #3. An order is said to be "covered" by a product set if every product in the order is included in the set.

Another approach referred to as a revenue coverage optimization approach or RCO ranks the products in the following order product #3, product #2 and product #1. Using the RCO approach, product #3 would be ranked first since it is required in order to fulfill all of the orders 102-106. Product #2 would be ranked second since it would bring in the highest revenue ($200) of the remaining products that are only part of a single order. Finally, product #3 would be ranked last since it is only in one order and provides the least amount of revenue ($100). The RCO approach can be mathematically intensive when dealing with large amounts of order data. In the approach of the present invention described below and which will be referred to as a heuristic approach, the results achieved approach those of the RCO approach discussed above, however the results can be calculated faster even for large datasets.

In accordance with various embodiment of the invention, methods and apparatuses are described that help reduce the number of products included in a product portfolio to a set of products that is expected to cover most, or at least a substantial amount of order revenue, profit or number of orders covered. The disclosed approach improves the on the time required to determine which products from product order data should be part of a product portfolio. The heuristic approach as will be explained below is used in one embodiment to approximate portions of an order benefit (e.g., revenue) versus number of products in a product portfolio curve which provides a user with an efficient frontier of possible solutions to select from.

The present invention saves on the time needed to generate one or more potential solutions to the user. The solutions can be provided as an efficient frontier of order benefit such as revenue as a function of product portfolio size. For example, a curve showing different percentages of revenue coverage of historical orders can be generated as a function of the number of products that need to be carried by the business in order to reach that coverage level. This information will allow a business to make some informed decisions at to how much potential revenue the business might be willing to forgo (assuming they decide on a solution that does not provide 100% revenue coverage) versus the number of products it is willing to carry as part of its product portfolio, keeping in mind the costs involved with larger product portfolios.

In one embodiment, the invention generates a sparse number of optimal solution points along an order benefit versus number of products curve using a program such as a linear program. Other techniques can also be employed to determine the optimal solution points such using an integer program or other known techniques. Time savings are achieved in finding the entire solution curve by approximating solution points between the optimal solution points using an approximation or heuristic approach that requires less computational resources to find solutions than the linear program. For large product portfolios, the time savings can equate to a large amount of savings given the need for less computational resources to generate the solution set.

By using the heuristic technique combined with the linear program or some other technique, larger data sets can be analyzed in a reasonable amount of time. A heuristic is a technique that usually, but not always, gives the correct answer, however, the heuristic provides faster results.

In one embodiment, the linear program used to calculate the optimal solution points comprises a linear program which will be referred to as an Langrangian Relaxation, LR($\lambda$). Some notation used for LR($\lambda$) include:

Decision Variables $X_p$ $Y_o$

Constraints

Order o is not covered unless each product p in the order is included: $Y_o \leq X_p$ for each product-order combination (o,p).

X and Y variables are between the continuous values of zero and one: $0 \leq X_p \leq 1$ and $0 \leq Y_o \leq 1$.

Objective Function

Maximize the total revenue of orders covered: $\Sigma_o R_o Y_o - \lambda (\Sigma_p X_p - n)$, or equivalently, since $-\lambda n$ is a constant, maximize the total revenue of orders covered minus $\lambda$ times the number of products included in the product portfolio which is a penalty term: $\Sigma_o R_o Y_o - \lambda \Sigma_p X_p$.

$R_o$=revenue, profit, 1 (setting $R_o$ equal to 1 means that selecting the portfolio of a certain size to maximize the number of orders covered) for each order o.

X and Y comprise vectors that represent products and orders respectively. $X_p, Y_o$ are continuous variables with values in a particular range such as in the interval of 0 to 1. A penalty term is included in the objective, $-\lambda(\Sigma_p X_p - n)$. The number of products used in the solution is penalized by a nonnegative number $\lambda$ or penalty multiplier.

The solution to LR($\lambda$) can be restated as finding the subset of orders O' such that R(O')$-\lambda$|C'| is maximized, wherein R(O') is the total revenue of all orders in subset O', C' is the set of products necessary to cover all the orders in O', and |C'| represents the size of the set C'. The series of solutions that is generated by LR($\lambda$) are nested, meaning that $\lambda_1 > \lambda_2$ and the optimal portfolio for LR($\lambda_2$) is a subset of the product portfolio for LR($\lambda_1$).

The LR algorithm above should be run first using one or more specific lambda values to generate a sparse set of optimal solutions that help to eliminate products that don't need to be examined by the heuristic technique. The elimination of products helps remove the larger errors the heuristic technique can make. It should be noted that the present invention can use other techniques besides the LR to determine the optimal solution points. By eliminating products from consideration, the less accurate portion of the heuristic technique is not only removed, but it makes the heuristic technique more accurate and helps it come closer in providing optimal solutions.

Figure 2:
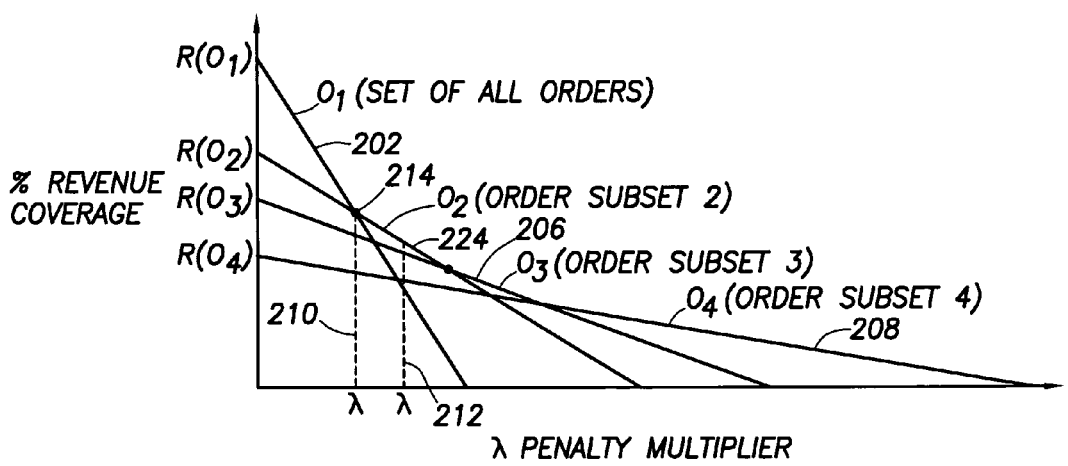
FIG. 2 shows a graph of revenue coverage as a function of a penalty multiplier in accordance with an embodiment of the invention.

Referring now to FIG. 2, each subset of orders O' with its supporting product subset gives one line as a linear function of $\lambda$. Each of the graph lines is determined by formula R($O_N$)–$\lambda$|$C_N$|, where N is the subset number. Solving LR($\lambda$) for any fixed $\lambda$ involves finding the O' that corresponds to the highest line at $\lambda$ 212 in FIG. 2. The highest graph line for an order subset is for order subset $O_2$ 204. Line 204 corresponds to an order subset that is optimal for the value of lambda, $\lambda$ 212. This intuitive illustration leads to a number of heuristic solutions that helps improve the speed in which a results report can be generated.

Solving LR($\lambda$) for all values of $\lambda$ is equivalent to finding a piecewise-linear curve on the top of all the lines in FIG. 1. The sections 202, 224, 206 and 208 of graph lines $O_1$, $O_2$, $O_3$ and $O_4$ that forms the top section of all the graph lines is referred to as the upper envelope. In this particular example, the first segment labeled $O_1$ in the figure corresponds to the set of all orders, assuming all orders have positive revenue. The second segment, $O_2$, corresponds to a subset of $O_1$ as a result of the nested-ness property LR technique. Finding $O_2$ is equivalent to removing the subset of orders from $O_1$ that minimizes the ratio of the removed revenue to the number of products that are no longer needed to support the remaining orders. The same process is repeated in order to find order subsets $O_2$, $O_3$ and $O_4$. It should be noted that although revenue (R) is discussed in this embodiment, another order benefit such as profit or some other criteria can be also used to determine the optimal solution(s).

The $O_2$ line is the one that intersects with line $O_1$ at the smallest value of $\lambda$ 210. The intersection point of the two graph lines 214 can be located by setting the equations of the lines for $O_1$ and $O_2$ equal to each other, and solving for $\lambda$ 214 as follows:

$$R(O_1) - \lambda|C_1| = R(O_2) - \lambda|C_2| \quad (1)$$

which yields:

$$\lambda = \frac{R(O_1) - R(O_2)}{|C_1| - |C_2|}. \quad (2)$$

In accordance with an embodiment of the invention, once an optimal solution is achieved for one or more optimal solution points using a technique such as LR($\lambda$), a heuristic or approximation method is run on the subset of products and orders that are removed by the optimal solution using the technique described above.

The heuristic method of the invention helps fill in the "in-between" values located between the sparse set of optimal solutions solved by the optimal but slower linear programming technique. By solving for two or more optimal solution points using LR($\lambda$) and then using the heuristic approach for the in-between values, solutions can be achieved much quicker, even when large data sets are involved.

It should be noted that at least one subset of orders has to be removed in order to remove one product from the set of all orders $O_1$. For any product that is removed, all orders that depend on that product are also removed, also all the products that are only ordered in the removed orders are also removed. For each product "p" there is an associated order subset and product subset ($O_p$, $C_p$) that forms a minimum subset that has to be removed together. These subsets are referred to as "basic subsets."

Subsets that are removed from one stage of the solution (e.g., $O_i$) to get to the next stage (e.g., $O_i$+1) are unions of the two subsets. The search is conducted between the union of the two subsets to get the optimal solution. Searching all unions of subsets is mathematically intensive. Instead of searching all subsets, only selected subsets are preferably searched. Any particular method of limiting the search will yield a heuristic method covered in accordance with different embodiments of the invention.

Some ways of restricting the subsets include searching only the basic subsets ($O_p$, $C_p$). This approach can provide a good approximation solution in a short period of time. Another heuristic approach that can be used is searching through all the basic subsets plus the subsets with one more order; this is similar to looking ahead one more order.

Figure 3:
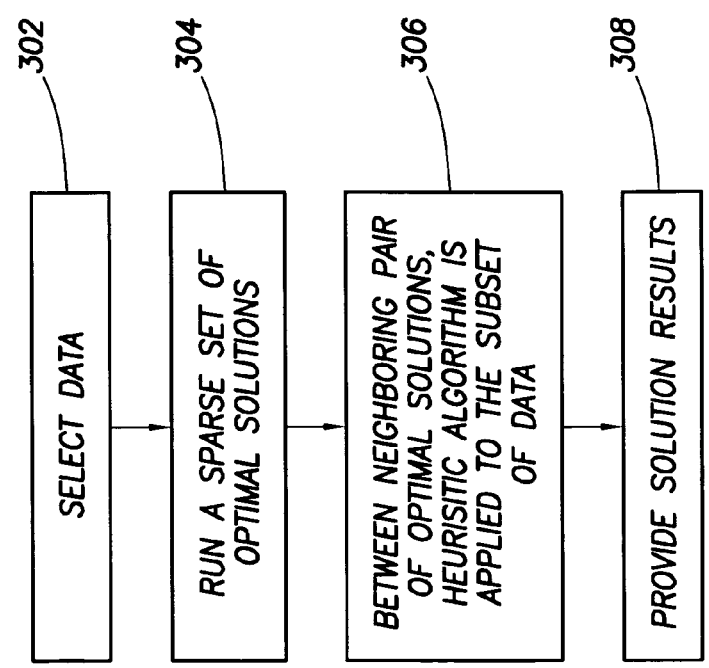
FIG. 3 shows a flowchart highlighting a product selection method using a combined technique in accordance with an embodiment of the invention.

In FIG. 3 there is shown a simplified flowchart highlighting the combined method in accordance with an embodiment of the invention. In 302, data is selected for analysis. This data can include historical order data which includes both order benefit such as order revenue or order profit and the products within the order information. A sparse set of optimal solutions using any algorithm such as the LR($\lambda$) linear program is performed in 304. In 306, between each neighboring pair of optimal solution points, the heuristic approach of the present invention is applied to the subset of data between the two optimal solutions. The method concludes at 308 where a report or other information is generated providing the results. See for example the efficient frontier of revenue coverage versus number of products graph line 506 shown in FIG. 5.

The results at 308 can include a graph or table highlighting an efficient frontier line of for example revenue coverage versus product portfolio size. The results can then be used by a business to decide which product portfolio size is best suited for a particular business situation. For example, the results would allow a person to make tradeoff decisions based on the inventory carrying costs of having a product portfolio of a certain size versus the percentage of revenue coverage based on past orders that the portfolio would be able to provide. A person can then tradeoff not being able to cover all previous orders in exchange for a smaller product offering with its associated cost savings.

Figure 4:
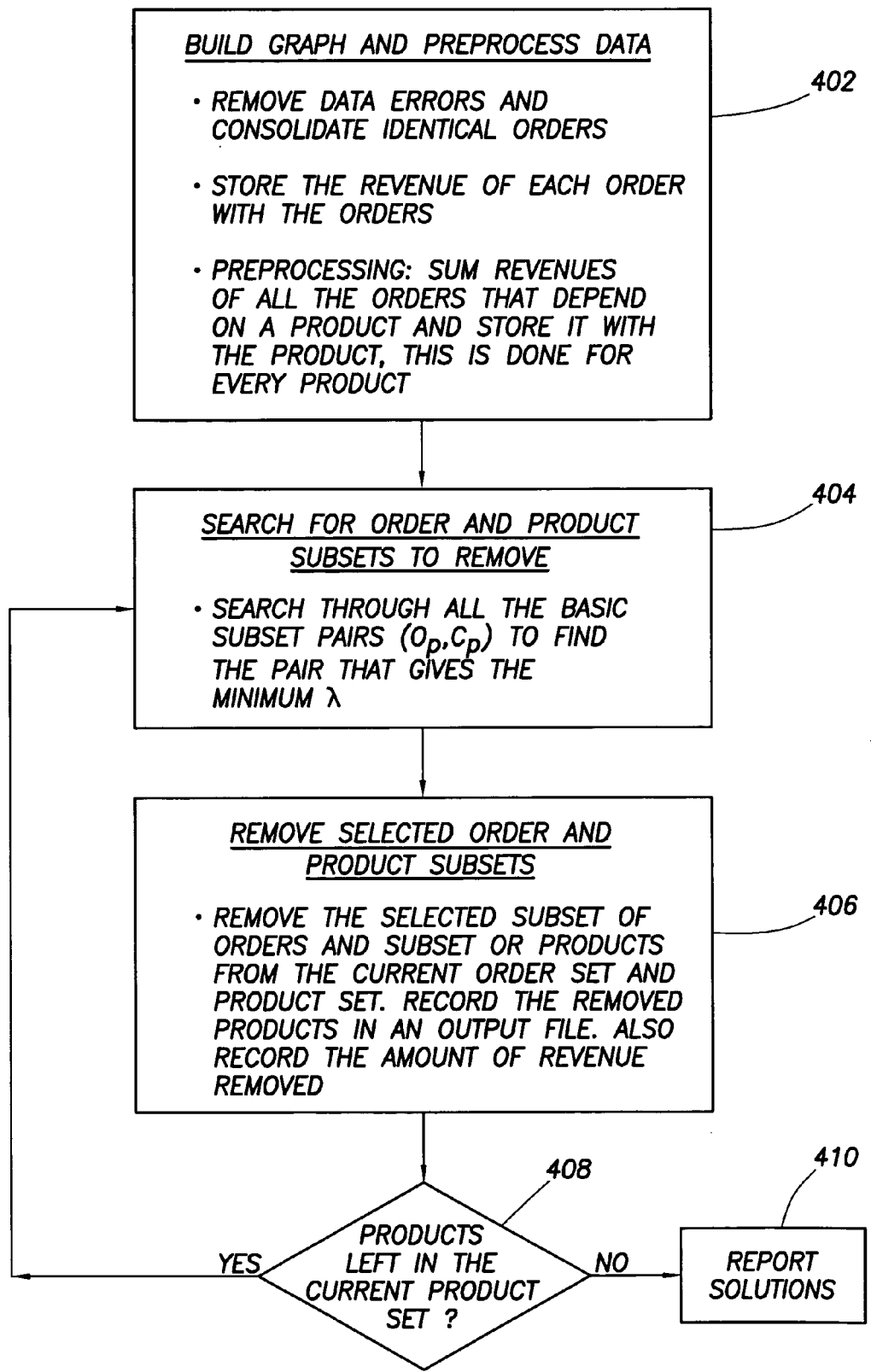
FIG. 4 shows a more detailed flowchart of the product selection method in accordance with an embodiment of the invention.

In FIG. 4, there is shown a flowchart of a product selection method in accordance with an embodiment of the invention. In 402, historical product-order data and order revenue data is preprocessed in order to remove data errors such as erroneous revenue numbers or products. During preprocessing, the total revenue of all orders that depend on a product are summed and stored with the product information. This information is repeatedly utilized in the computations. The stored sum is updated when a product-order link is removed due to the removal of products and orders.

In one embodiment, a product-order bipartite graph is generated and the revenue of each of the orders is stored with the order information. The revenues of all the orders that depend on a product are summed together and are stored with the product information; this is done for every product. The more preprocessing that is performed the faster the heuristic approach can provide results.

In 404, order and product sets to be removed are located. The process searches through all the basic subset pairs ($O_p$, $C_p$) to find the pair that gives the minimum $\lambda$. The subset of orders and products are removed from the current order set and product set respectively in 406. The removed products are recorded in a file along with the amount of revenue that has been removed. In 408, if any products are left in the current product set the routine moves back to 404. If no products are left in the current product set, in 410 solutions are reported. Solutions can be reported in many different ways, for example, via a graphical output that shows the solutions or a printed report.

Figure 5:
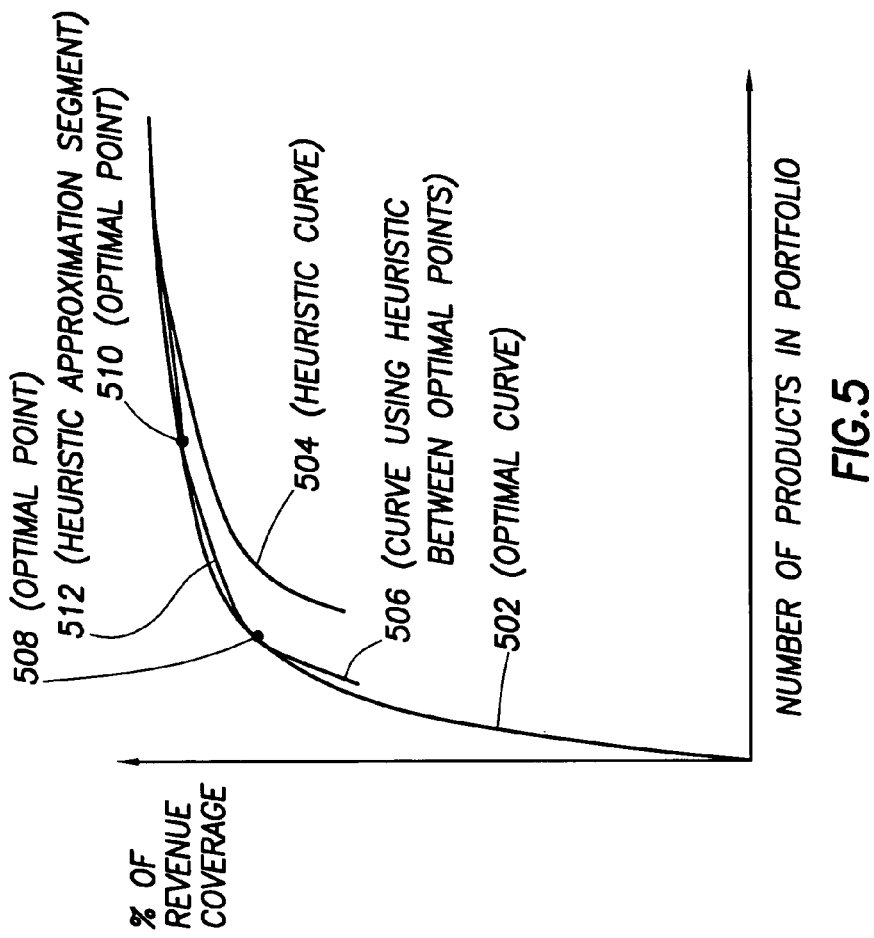
FIG. 5 shows a graph comparing different techniques of product selection in accordance with an embodiment of the invention.

Referring to FIG. 5, a graph of an optimal curve 502, a curve of the heuristic algorithm alone 504, and a curve 506 using the heuristic algorithm between two optimal solution points 508 and 510 are shown. As illustrated, constraining the use of the heuristic method between the two optimal solutions 508 and 510 provides better results as compared to using the heuristic method alone. As shown by line segment 512, the heuristic technique achieves good results between the chosen optimal solution points 508 and 510. In practice, a sparse set of optimal solution points such as points 508 and 510 are determined using linear programming, and the heuristic is applied between adjacent solution points in order to approximate the curve line between the solution points. By using the heuristic, computational resource usage is reduced providing for a cost savings when performing the product portfolio analysis. The number of optimal solution points used depends on how accurate the results need to be versus the extra time needed to determine the optimal solution points and the size of the efficient frontier graph solution curve desired.

Figure 6:
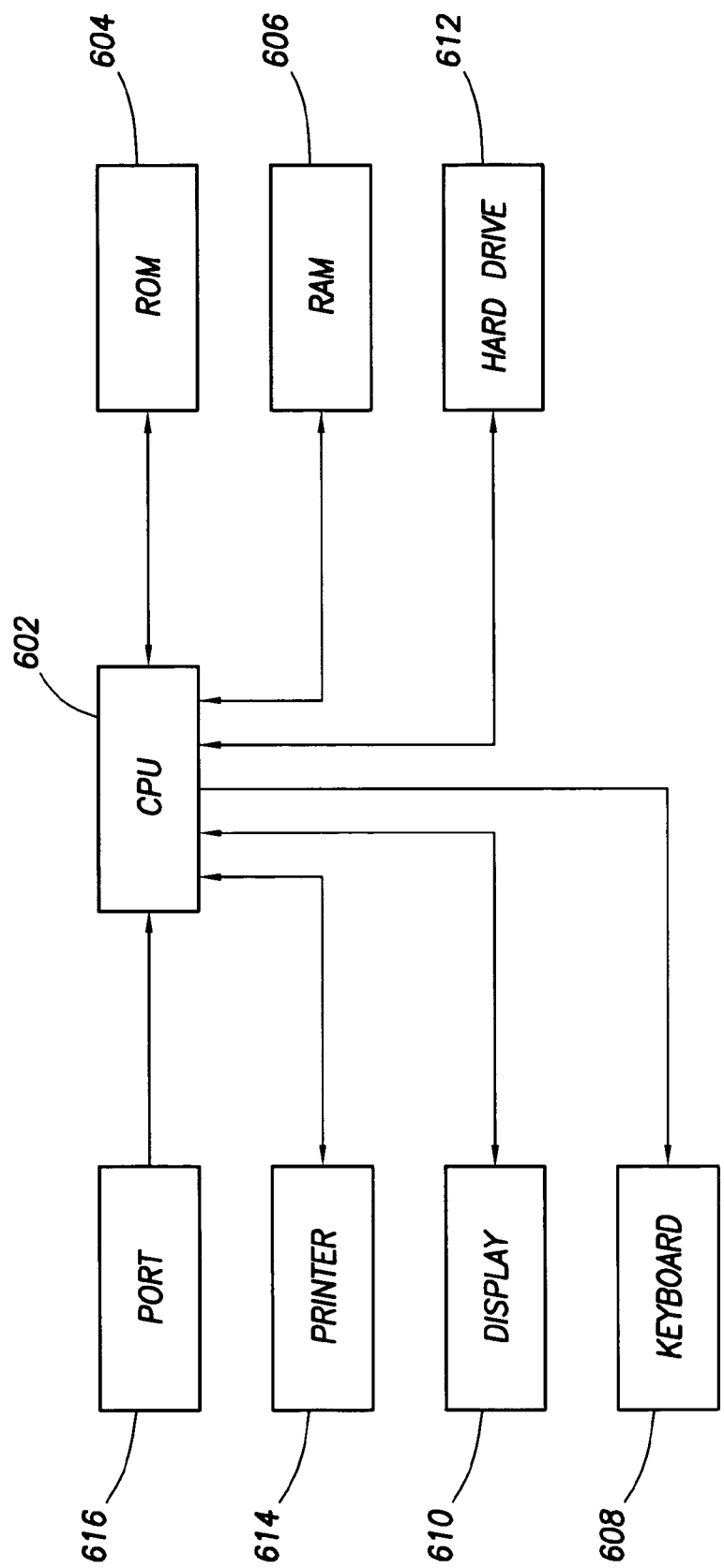
FIG. 6 shows a block diagram of an apparatus in accordance with an embodiment of the invention.

Referring now to FIG. 6, there is shown a computer system that can implement the method described above. The computer system 600 includes a central processing unit (CPU) 602, Read Only Memory (ROM) 604, Random Access Memory (RAM) 606, keyboard 608 for inputting information, display 610, non-volatile storage 612 (e.g., a hard drive), and a printer 614. The method described herein can be embodied in executable code stored on a storage medium such as the hard drive 612. The computer system 600 allows the revenue coverage optimization executable code to be executed on the CPU 602 with the results being stored on the hard drive 612 or other storage location. Historical product order data and order revenue data that are used in determining the products for the product portfolio can be received by input/output (I/O) port 616. I/O 616 can comprise an Ethernet, serial, parallel, or any other type of port. I/O port 616 receives the product order data and the order revenue data can be stored in servers or other data storage devices that are coupled via a network, such as a local area network (not shown) to computer system 600. In an alternative embodiment, the order data can be stored locally in for example hard drive 612.

In another embodiment where the hard drive 612 has stored therein the product order and order revenue data, then the CPU 602 can receive the data from the hard drive 612. The results can also be shown graphically on display 610 and/or printed using printer 614. The computer system 600 can be coupled to other computer systems via port 616. Results from computer system 600 can be sent to other systems (e.g., a server) via the port 616 and results stored at a remote site or locally on hard drive 612.

The invention can be generalized in several ways. First, the objective of order revenue coverage maximization can be replaced with any number of different objectives: maximizing the number of orders covered, the profit of orders covered, or maximizing any other metric that applies to individual orders. The goal of restricting the product set to a certain size can be replaced with a limit on the cost of the product set, or a limit on any other metric that applies to products individually.

Besides preprocessing of the historical order data, another technique that can help speed up the heuristic approach, instead of calculating $$\lambda = \frac{R(O_1) - R(O_2)}{|C_1| - |C_2|},$$

a quick estimate of $\lambda$ can be used. To find the minimum order/product subsets that need to be removed, searching for the minimum during the preprocessing can be done. In another embodiment, the process can be reversed with the process commencing at the empty set of orders and products, gradually adding orders and products so that after each addition, the next piece of the linear function is determined. In the illustrative example shown in FIG. 2, using this reverse technique, the first subset determined would be $O_4$, followed by $O_3$, then $O_2$, and finally $O_1$.

In one illustrative comparison between the simple ranking of products based on revenue generation and the present invention use of the heuristic approach described above, it was found that for a revenue coverage level of 90%, the simple ranking approach needed 326 in the product portfolio. The heuristic approach described herein achieved the same revenue coverage level of historical orders needing only 223 products in its corrected/mjcproduct portfolio. This comes out to 46% less products needed in the product portfolio, which of provides for improved business efficiencies and cost savings.

The above discussion is meant to be illustrative of the principles and various embodiments of the present invention. Numerous variations and modifications will become apparent to those skilled in the art. It is intended that the following claims be interpreted to embrace all such variations and modifications.

What is claimed is:

1. A method for product portfolio analysis, comprising:

selecting, via a Central Processing Unit ("CPU"), a set of optimal solution points along a curve of revenue as a function of the number of products in a product portfolio stored in memory; and performing an approximation via the CPU between an adjacent pair of optimal solution points that approximates the curve of revenue as a function of the number of products in the product portfolio, the approximation includes:

solving for $$\lambda = \frac{R(O_1) - R(O_2)}{|C_1| - |C_2|},$$

wherein $R(O_1)$ is a revenue for a first subset of orders, $R(O_2)$ is a revenue for a second subset of orders, $|C_1|$ is the number of products in the first subset of orders, $|C_2|$ is the number of products in the second subset of orders and $\lambda$ is a penalty multiplier.

2. A method as defined in claim 1, wherein the selecting comprises using a linear program to find the set of optimal solution points.

3. A method as defined in claim 1, wherein the linear program comprises a Lagrangian Relaxation.

* * * * *